(No Model.)

J. McLEAN.
COFFEE ROASTER.

No. 577,313.

Patented Feb. 16, 1897.

WITNESSES:

INVENTOR
J. McLean
BY
Munn & Co
ATTORNEYS.

UNITED STATES PATENT OFFICE.

JOHN McLEAN, OF MILLER'S FERRY, ALABAMA.

COFFEE-ROASTER.

SPECIFICATION forming part of Letters Patent No. 577,313, dated February 16, 1897.

Application filed October 16, 1895. Serial No. 565,850. (No model.)

*To all whom it may concern:*

Be it known that I, JOHN MCLEAN, of Miller's Ferry, in the county of Wilcox and State of Alabama, have invented a new and Improved Coffee-Roaster, of which the following is a full, clear, and exact description.

This invention relates to certain improvements in roasters such as are employed for roasting coffee and the like, and has for its object to provide a device of this character of a simple and inexpensive construction which shall be adapted to act in a measure automatically and provided with means to prevent the burning or scorching of the coffee while being roasted.

The invention consists in a roaster comprising a casing, a rotative drum to contain the coffee, driving mechanism for rotating the drum, a lamp or equivalent heating device, and means actuated from the driving mechanism of the drum for controlling the heat applied to the coffee therein, so as to prevent the same from being burned or smoked.

The invention also contemplates certain novel features of the construction, combination, and arrangement of the various parts of the device whereby certain important advantages are attained and the device is made simpler, cheaper, and otherwise better adapted and more convenient for use than various other similar devices heretofore employed, all as will be hereinafter fully set forth.

The novel features of the invention will be carefully defined in the claims.

Reference is to be had to the accompanying drawings, forming a part of this specification, in which similar characters of reference indicate corresponding parts in all the views.

Figure 1:
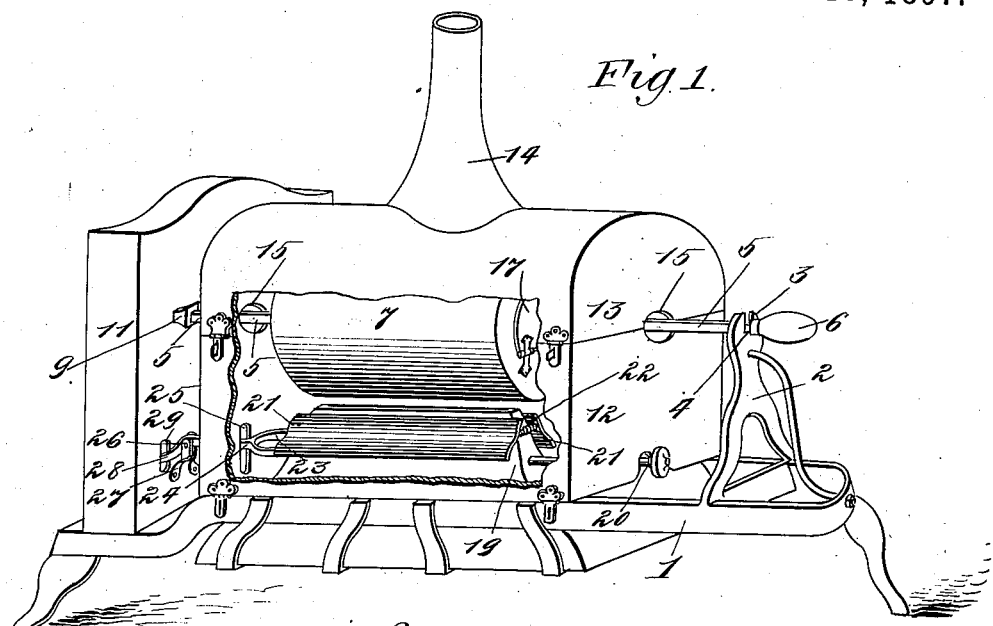
Figure 2:
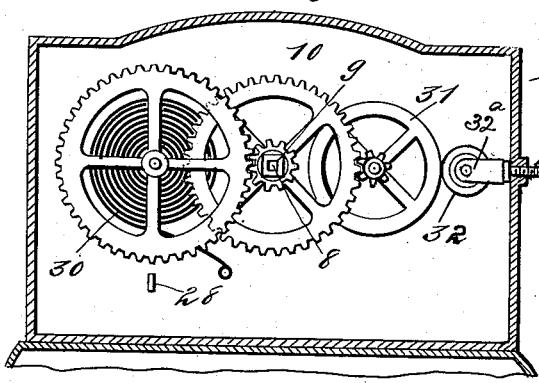
Figure 3:
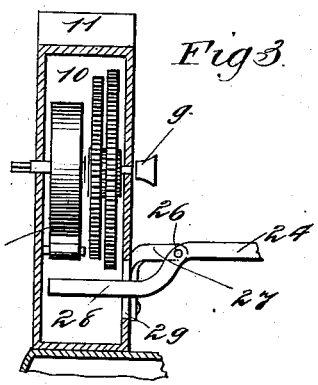
Figure 4:
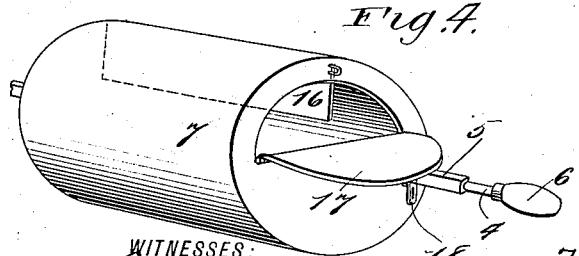
Figure 5:
Figure 6:
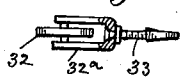

Figure 1 is a perspective view showing the device constructed according to my invention, the casing being broken away at one side to show the inclosed parts. Fig. 2 is a sectional view taken virtually through the casing of the motor. Fig. 3 is a similar section taken through the casing of the motor at right angles to the plane of the section in Fig. 2. Fig. 4 is a perspective view showing the rotative drum detached. Fig. 5 is an enlarged fragmentary perspective detail view showing the connection between the drum-shaft and the motor; and Fig. 6 is a plan view of the friction-wheel, its supporting-yoke, and operating-screw, the yoke being broken away.

The device comprises a frame or bed-plate 1 of suitable construction having at one end a standard 2. The upper part is notched, as seen at 3 in Fig. 1, to form an open bearing to receive the rounded reduced or grooved portion 4 of a shaft 5 of rectangular cross-section having at one end a handle 6 and carrying the drum 7, which may be constructed of sheet metal of any desired dimensions.

The end of the rectangular shaft 5 is arranged to be inserted in a rectangular socket or hollow 8 in the end of an arbor 9, driven from a clock mechanism or other motor 10, inclosed in a casing 11, located at the end of the bed-plate 1, opposite the standard 2, so that said drum 7 will be driven from said clockwork during the roasting of the coffee.

The drum 7 is inclosed in a casing 12 of any desired material and construction having, as herein shown, a hinged cover 13, provided with a gas outlet or chimney 14, and said casing has at its ends apertures 15, through which the ends of the rectangular shaft 5 extend, as clearly seen in the drawings. By this construction it will be seen that when it is desired to remove the drum to fill or empty the same it is only necessary to draw the shaft 5 endwise to disengage it from the socket 8 and to raise the cover of the casing 12, whereupon said drum may be removed entirely from the casing.

The drum is provided in its interior with a projecting plate or flange 16, adapted to lift the coffee and let the same fall as the drum turns, so that the coffee will be continuously and thoroughly agitated to prevent burning or scorching during the operation of the device, and at one end said drum 7 is provided with an opening for the insertion and withdrawal of the coffee, said opening being closed by a door or plate 17, having a fastening device 18, as clearly seen in Fig. 4.

Beneath the drum 7 and within the casing 12 is arranged a burner 19 of any desired character, which may be, for example, an oil-lamp having a wick-adjusting device 20, and at opposite sides of said burner are arranged plates 21, connected at their upper edges by a spiral spring 22 and having their lower ends pivoted on the forks 23 of a bifurcated lever 24, projecting through an opening 25 in the casing 12 and pivoted at 26 to a bracket 27 on the side of the motor-casing 11, as seen in Figs. 1 and 3.

The extremity 28 of the lever 24 is bent down, as indicated in Fig. 3, and extended through an opening 29 in the side of the casing 12, within which said extremity 28 is arranged in position to be engaged and depressed by the spring 30 of the clock-movement 10 therein as said spring uncoils, so that the plates 21 are lifted sufficiently to raise their upper edges above the wick-tube of the burner 19, whereupon the spring 22 acts to draw said plates together in such a way as to extinguish the flame of said burner, as will be readily understood.

The clock-movement 10 in the casing 11 comprises a flat-faced wheel 31, the periphery of which is in contact with a friction-wheel 32, mounted in a yoke 32ª, to which is swiveled a screw 33, screwing into the side of the casing, so that by turning said screw the friction-wheel 32 may be caused to bear with more or less force on the periphery of the wheel 31 to control the speed of the motor or stop the same entirely.

In operation when it is desired to roast coffee the drum is placed in position and the burner lighted, after which the screw 33 is turned so as to permit the motor to operate to rotate the drum. When the operation has continued a sufficient time, the spring 30 comes to bear on the end 28 of the lever 24 and acts as above described to automatically extinguish the flame at the burner.

The device constructed as above described is of an extremely simple and inexpensive nature and is well adapted for roasting coffee and the like, since it dispenses with the attention of the user and prevents the coffee from being burned or scorched, as it would be likely to be otherwise.

It will also be obvious from the above description of my improvements that the device is susceptible of considerable modification without material departure from the principles and spirit of the invention, and for this reason I do not wish to be understood as limiting myself to the exact construction of the device herein set forth.

Having thus described my invention, I claim as new and desire to secure by Letters Patent—

1. A roasting device, comprising a rotary drum, a burner, and a motor for driving the drum and arranged to control said burner, substantially as set forth.

2. A roasting device, comprising a casing, a rotary drum in the casing, a motor for operating the drum, a burner below the drum, an extinguisher for the burner, and intermediate mechanism between the motor and extinguisher for operating the latter from the former, substantially as described.

3. A roasting device, comprising a casing, a rotary drum in the casing, a motor for operating the drum, a burner in the casing below the drum, an extinguisher for the burner, comprising pivoted and spring-pressed plates, and a pivoted lever with which the extinguisher-plates are connected, said lever being adapted to be operated at a predetermined time by the motor, substantially as and for the purpose set forth.

4. A roasting device, comprising a casing, a rotary drum in the casing, a spring-motor for operating the drum, a burner below the drum, pivoted and spring-pressed plates for extinguishing the burner, and a lever to which the said plates are connected, said lever projecting below the motor to be engaged by the spring thereof as it uncoils, substantially as described.

5. In a roasting device, the combination with a casing, a rotary drum mounted therein, and a burner below the drum, of a pivoted lever projecting into the casing, pivoted and spring-pressed plates carried by the said lever, and a motor for operating the said lever at a predetermined time, substantially as described.

6. In a roasting device, the combination with a casing, a rotary drum in the casing, and a burner below the drum, of a spring-motor, a bifurcated lever projecting into the casing and extending below the motor to be engaged by its spring as it uncoils, and plates pivoted to the members of the lever and connected together by a spring, substantially as described.

7. In a roasting device, the combination with a frame, a casing on the frame and having a cover, and a motor at one end of the said frame and having its arbor provided with a socket, of a bearing at the end of the frame opposite the motor, and a shaft carrying a drum in the casing, one end of the shaft being mounted in the said bearing and the other end engaging the socket of the motor-arbor, substantially as described.

JOHN McLEAN.

Witnesses:
H. A. RATCLIFFE,
S. C. JENKINS.